United States Patent
Ohnishi (10) Patent No.: US 10,967,652 B2
(45) Date of Patent: Apr. 6, 2021

(54) PRINTING DEVICE AND PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/297,744

(22) Filed: Mar. 11, 2019

(65) Prior Publication Data
US 2019/0283458 A1    Sep. 19, 2019

(30) Foreign Application Priority Data

Mar. 13, 2018    (JP) .............................. JP2018-045441

(51) Int. Cl.
| | | |
|---|---|---|
| *B41J 11/00* | (2006.01) | |
| *C09D 11/322* | (2014.01) | |
| *B41M 5/00* | (2006.01) | |
| *B41J 2/21* | (2006.01) | |

(52) U.S. Cl.
CPC .............. *B41J 11/002* (2013.01); *B41J 2/21* (2013.01); *B41J 11/0015* (2013.01); *B41M 5/0011* (2013.01); *C09D 11/322* (2013.01)

(58) Field of Classification Search
CPC ........ B41J 11/002; B41J 11/0015; B41J 2/21; B41J 2/2146; B41J 2/2114; B41M 5/0011; B41M 7/0081; B41M 5/0017; C09D 11/3811; C09D 11/40; C09D 11/322
See application file for complete search history.

(56) References Cited

U.S. PATENT DOCUMENTS

| | | | |
|---|---|---|---|
| 2006/0256176 A1* | 11/2006 | Prasad .................... | C09D 11/38 347/100 |
| 2017/0057245 A1* | 3/2017 | Morita .................... | B41J 2/2114 |
| 2018/0111389 A1* | 4/2018 | Ohnishi ............... | C09D 11/101 |

FOREIGN PATENT DOCUMENTS

WO          2017135425          8/2017

* cited by examiner

*Primary Examiner* — Sharon Polk
(74) *Attorney, Agent, or Firm* — JCIPRNET (57) ABSTRACT

To perform high-quality printing more appropriately, a printing device that performs printing on a medium includes: an inkjet head as a head for pretreatment agent that ejects a pretreatment agent; inkjet heads as heads for color ink; and an ultraviolet ray irradiation unit as an energy ray irradiation unit. The pretreatment agent is a liquid that contains a solvent and generates heat in response to ultraviolet rays. The ultraviolet ray irradiation unit emits ultraviolet rays to respective positions at which printing is performed on the medium after the inkjet head ejects the pretreatment agent, and evaporates at least part of the solvent in the pretreatment agent.

4 Claims, 4 Drawing Sheets

PRINTING DEVICE AND PRINTING METHOD

CROSS REFERENCE TO RELATED APPLICATIONS

This application claims the priority of Japan patent application serial no. 2018-045441, filed on Mar. 13, 2018. The entirety of the above-mentioned patent application is hereby incorporated by reference herein and made a part of this specification.

BACKGROUND OF THE INVENTION

Technical Field

The present disclosure relates to a printing device and a printing method.

Background Art

In the related art, as ink for an inkjet printer, widely used is evaporation-drying ink to be fixed to a medium (media) by evaporating a solvent in the ink. In recent years, as evaporation type ink, there has been developed ink (fast-drying ink) that generates heat when being irradiated with energy rays such as ultraviolet rays (for example, refer to Patent Literature 1).

Patent Literature 1: International Publication WO 2017/135425.

In a conventional configuration, in a case of drying ink by heating a medium with a heater and the like, for example, the ink is indirectly heated via the medium. Alternatively, in a case of using fast-drying ink, the ink itself generates heat, so that the ink can be directly heated while suppressing influence of heating and the like on surroundings. Additionally, in a case of using the fast-drying ink, by irradiating the ink on the medium with energy rays immediately after the ink is landed on the medium, the ink can be efficiently dried in a short time before bleeding of the ink (inter-color bleeding and the like) is generated.

SUMMARY

The present disclosure provides a printing device, configured to perform printing on a medium using color ink, the printing device including: a head for pretreatment agent serving as an inkjet head, configured to eject a pretreatment agent as a liquid that is applied to the medium before the color ink is applied to the medium; a head for color ink serving as an inkjet head, configured to eject the color ink; and an energy ray irradiation unit, configured to emit energy rays, wherein the pretreatment agent is a liquid that contains a solvent and generates heat in response to the energy rays, and the energy ray irradiation unit emits the energy rays to respective positions at which printing is performed on the medium after the head for pretreatment agent ejects the pretreatment agent, and evaporates at least part of the solvent in the pretreatment agent.

With this configuration, for example, in a case of using the pretreatment agent, the pretreatment agent can be efficiently and appropriately dried. Due to this, for example, it is possible to appropriately prevent the occurrence of a problem (for example, a curl or cockling) that occurs when the total amount of the liquid to be ejected onto the medium is increased. The liquid to be ejected onto the medium is, for example, the pretreatment agent and the color ink. Thus, with this configuration, for example, high-quality printing can be performed more appropriately.

In this configuration, for example, the energy ray irradiation unit emits energy rays to respective positions at which printing is performed on the medium after the head for pretreatment agent ejects the pretreatment agent and before the head for color ink ejects the color ink, and evaporates at least part of the solvent in the pretreatment agent. With this configuration, for example, drying of the pretreatment agent can be appropriately facilitated before the color ink is ejected to the respective positions on the medium. Due to this, for example, the total amount of the liquid applied to the medium can be appropriately reduced at each timing. In this configuration, for example, the energy ray irradiation unit dries the pretreatment agent to a degree such that problems such as a curl and cockling do not occur even when the color ink is further ejected after the pretreatment agent is ejected. Depending on the configuration of the pretreatment agent or the color ink to be used, it may be preferable that the solvent in the pretreatment agent remains at a time when the color ink is landed. In this case, for example, only part of the solvent may be evaporated without completely drying the pretreatment agent. In such a case, energy rays may be collectively emitted to the pretreatment agent and the color ink after the color ink is ejected without emitting energy rays to the pretreatment agent before the color ink is ejected.

In this configuration, for example, the pretreatment agent can be considered to be a fast-drying liquid. As the pretreatment agent, for example, a liquid containing a substance that coagulates components of the color ink may be used. In this case, for example, "coagulates components of the color ink" means to coagulate solid components and the like contained in the color ink. In this case, for example, coagulation can be considered to be a phenomenon including a phenomenon called solidification, congelation, and the like. In this configuration, as the color ink, for example, ink containing a disperser that prevents the components (for example, solid components) in the ink from being coagulated may be used. In this case, for example, the pretreatment agent cancels an effect of the disperser in the color ink to coagulate the components of the color ink.

In this configuration, as the pretreatment agent, for example, a liquid containing an energy absorber that absorbs energy rays and generates heat can be preferably used. With this configuration, for example, the pretreatment agent can be caused to generate heat more appropriately by being irradiated with energy rays. As energy rays, for example, ultraviolet rays can be preferably used. In this case, as the energy ray irradiation unit, for example, a configuration using an LED (UVLED) that generates ultraviolet rays (UVLED irradiator) and the like can be preferably used.

In this configuration, as the medium, an absorbable medium and the like that absorbs the pretreatment agent such as paper or fabric may be used, for example. In a case of using such an absorbable medium, problems such as a curl and cockling of the medium easily occur when printing is performed with a conventional configuration. By contrast, when the configuration as described above is used, it is possible to appropriately prevent the occurrence of such problems by using a fast-drying pretreatment agent. More specifically, in this case, for example, the energy ray irradiation unit emits energy rays to the pretreatment agent applied to the medium to dry the pretreatment agent at least to be in a state in which a curl and cockling of the medium are not generated after the color ink is ejected onto the medium.

In this configuration, the fast-drying ink is preferably used also as the color ink. In this case, for example, the color ink can be considered to be ink that contains a solvent and generates heat in response to energy rays. In this case, the energy ray irradiation unit further emits energy rays to the respective positions at which printing is performed on the medium after the head for color ink ejects the color ink thereon, and evaporates at least part of the solvent in the color ink. With this configuration, for example, the color ink can also be efficiently dried in a short time. Due to this, for example, it is possible to more appropriately prevent the occurrence of bleeding of the ink. For example, it is possible to more appropriately prevent the occurrence of a problem that occurs when the total amount of the liquid to be ejected onto the medium is increased.

In this case, for example, by coagulating the color ink on the medium using the pretreatment agent, for example, viscosity of the ink can be caused to be hardly lowered at a time when the color ink generates heat. Also in this case, by achieving a condition for causing the color ink to hardly bleed by using the pretreatment agent, a condition for emitting energy rays to the color ink can be caused to be gentle as compared with a case of not using the pretreatment agent, for example. More specifically, in a case of emitting energy rays to the color ink applied to the medium, for example, the energy ray irradiation unit may emit energy rays to the color ink so that the solvent in the color ink does not boil. With this configuration, for example, it is possible to appropriately prevent the occurrence of a problem that occurs when the temperature of the ink temporarily becomes high. "The problem that occurs when the temperature of the ink temporarily becomes high" means a problem such that a surface of the ink is coarsened because the solvent in the ink bumps, for example.

As the color ink, for example, ink containing a solid colorant such as a pigment may be used. In this case, by causing the viscosity of the ink to be hardly lowered using the pretreatment agent that coagulates the components of the color ink, for example, it is possible to appropriately prevent the occurrence of the coffee stain phenomenon and the like. In this case, by heating the ink under a condition for preventing the solvent in the color ink from boiling, for example, the temperature of the ink can be prevented from rising, and the viscosity can be prevented from being temporarily lowered more appropriately. Thus, with this configuration, for example, printing by using fast-drying color ink can be more appropriately performed while appropriately preventing the occurrence of the coffee stain phenomenon and the like.

In this configuration, at a time when the ink as the pretreatment agent is ejected, typically, color mixture and the like with ink of another color do not occur. Thus, also at the time when the pretreatment agent is ejected, heating may be performed under a gentle condition such that the solvent in the pretreatment agent does not boil, for example. More specifically, in a case of emitting energy rays to the pretreatment agent applied to the medium, for example, the energy ray irradiation unit emits energy rays to the pretreatment agent so that the solvent in the pretreatment agent does not boil. With this configuration, for example, it is possible to appropriately prevent the occurrence of a problem that occurs when the temperature of the pretreatment agent temporarily becomes high.

As the pretreatment agent, for example, a liquid other than the liquid for coagulating the components of the color ink may be used. More specifically, for example, in a case of using ink for performing color development processing after applied to the medium (for example, dye ink that develops a color through color development processing), a color developing assistant and the like may be used as the pretreatment agent. Also in this case, by using the fast-drying pretreatment agent, for example, it is possible to appropriately prevent the occurrence of a problem that occurs when the total amount of the liquid to be ejected onto the medium is increased. From a viewpoint of preventing the coffee stain phenomenon and the like, as the configuration of the present disclosure, a pretreatment agent other than the fast-drying pretreatment agent may be used. In this case, for example, by ejecting the fast-drying color ink onto the medium after ejecting the pretreatment agent, and coagulating the components of the color ink with the pretreatment agent, the coffee stain phenomenon can be appropriately prevented. In this case, by coagulating the components of the color ink, for example, it is possible to appropriately prevent the occurrence of bleeding of the ink. Focusing on a characteristic of coagulating the color ink, as the configuration of the present disclosure, a liquid for coagulation as a liquid containing a substance that coagulates the components of the color ink may be used, and a fast-drying liquid may be used as the liquid for coagulation. In this case, the liquid for coagulation may be ejected to the respective positions on the medium after the color ink. As a configuration of the present disclosure, a printing method having a characteristic similar to that described above may be used, for example. Also in this case, for example, an effect similar to that described above can be obtained.

According to the present disclosure, for example, high-quality printing can be performed more appropriately.

BRIEF DESCRIPTION OF THE DRAWINGS

FIG. 1A to 1B are diagrams illustrating an example of a printing device 10 according to an embodiment of the present disclosure.

FIG. 2A to 2C are diagrams for explaining a phenomenon caused after color ink is landed on a medium 50.

DESCRIPTION OF EMBODIMENTS

The configuration of using the fast-drying ink is a technique that has been recently developed, so that various characteristics thereof are desired to be further examined. Based on such examination, it is desired to more appropriately perform printing with high quality. Thus, the present disclosure provides a printing device and a printing method that can solve the problem described above.

The inventor of the present disclosure has made vigorous investigation on the configuration of using the fast-drying ink. Through this vigorous investigation, the inventor has found that there is a case in which a phenomenon that is typically called a coffee stain phenomenon is easily caused in a case of using the fast-drying ink. In this case, for example, the coffee stain phenomenon means a phenomenon such that a colorant (pigment and the like) of the ink on the medium leans to a peripheral part. In this case, due to leaning of the colorant, pixels constituted of dots (print dots) of the ink form a doughnut shape in which a color of a center part is light and a color of a peripheral part is deep, for example. As a result, for example, in printed matter as a product of printing, a light color portion may be generated, or average density of a color for coloring may be reduced. Due to influence thereof, image quality may be deteriorated.

The inventor of the present disclosure has made further vigorous investigation to find that a cause that the coffee stain phenomenon is easily caused is related to a temperature of the ink at a time of drying. More specifically, in a case of using the fast-drying ink, the ink is caused to generate heat by being irradiated with energy rays such as ultraviolet rays. Accordingly, the ink is heated to a high temperature to be rapidly dried. In this case, as compared with a case of indirectly heating the ink by heating the medium with a heater and the like, for example, the ink can be heated to a higher temperature (for example, equal to or higher than 80° C.).

However, in this case, viscosity of the ink may be temporarily lowered due to the high temperature of the ink, and a flow of components of the ink may be generated from the center part to the peripheral part, for example, in the dots of the ink that are formed when droplets of the ink are landed on the medium. As a result, for example, the colorant of the ink such as a pigment tends to move to the peripheral part of the dot, and the coffee stain phenomenon may be easily caused.

To prevent the coffee stain phenomenon from occurring as described above, for example, it seems sufficient to suppress temperature rise of the ink and prevent the viscosity of the ink from being lowered. However, in a case of heating the ink while suppressing temperature rise, a time until the ink is sufficiently dried is prolonged, so that bleeding of the ink (inter-color bleeding and the like) is easily generated. Thus, by simply suppressing temperature rise of the ink, it may be difficult to appropriately perform printing with high quality.

The inventor of the present disclosure has conceived of performing preprocessing for preventing the occurrence of bleeding on the medium. The inventor of the present disclosure has also conceived of, as such preprocessing, ejecting a pretreatment agent and the like that coagulates components of the ink onto the medium with the inkjet head, for example. With this configuration, for example, viscosity of the ink (color ink) to be ejected onto the medium after preprocessing is enabled to be hardly lowered at a time of heating, for example. Due to this, for example, it is also possible to appropriately prevent the occurrence of the coffee stain phenomenon. In this case, for example, it is possible to appropriately prevent the occurrence of bleeding, even when the ink is heated while suppressing temperature rise. Thus, also from this viewpoint, it is possible to appropriately prevent the occurrence of the coffee stain phenomenon.

However, through further vigorous investigation, the inventor of the present disclosure has found that there is a case in which, when the pretreatment agent is used as described above, another problem may be caused because a total amount of liquid ejected onto the medium is increased. More specifically, in a case of performing printing using the pretreatment agent as described above, the pretreatment agent and the color ink are ejected onto the medium. In this case, as compared with a case of using only the color ink, for example, a total amount of the liquid to be ejected onto the medium is greatly increased. As a result, problems such as a curl and cockling of the medium may be easily caused, for example. In this case, the curl means, for example, a phenomenon such that the medium is curved. The cockling means, for example, a phenomenon such that wavy wrinkles are generated when the medium absorbs the liquid. In a case in which such problems occur, it is difficult to appropriately perform high-quality printing even if the pretreatment agent is used.

With respect to the problems, to appropriately dry the pretreatment agent in a short time, the inventor of the present disclosure has conceived of fast-drying of the pretreatment agent to generate heat when being irradiated with energy rays. With this configuration, for example, even in a case of using the pretreatment agent and the color ink, for example, the pretreatment agent and the color ink can be appropriately dried before a curl or cockling occurs. Due to this, for example, it is possible to appropriately prevent the occurrence of a problem that occurs when the total amount of the liquid to be ejected onto the medium is increased. Through further vigorous investigation, the inventor of the present disclosure has found that the configuration of using the fast-drying pretreatment agent is also useful for a case of using color ink other than the fast-drying ink, for example. Additionally, the inventor of the present disclosure has found a characteristic required for obtaining the effect described above, and made the present disclosure.

Figure 1A:
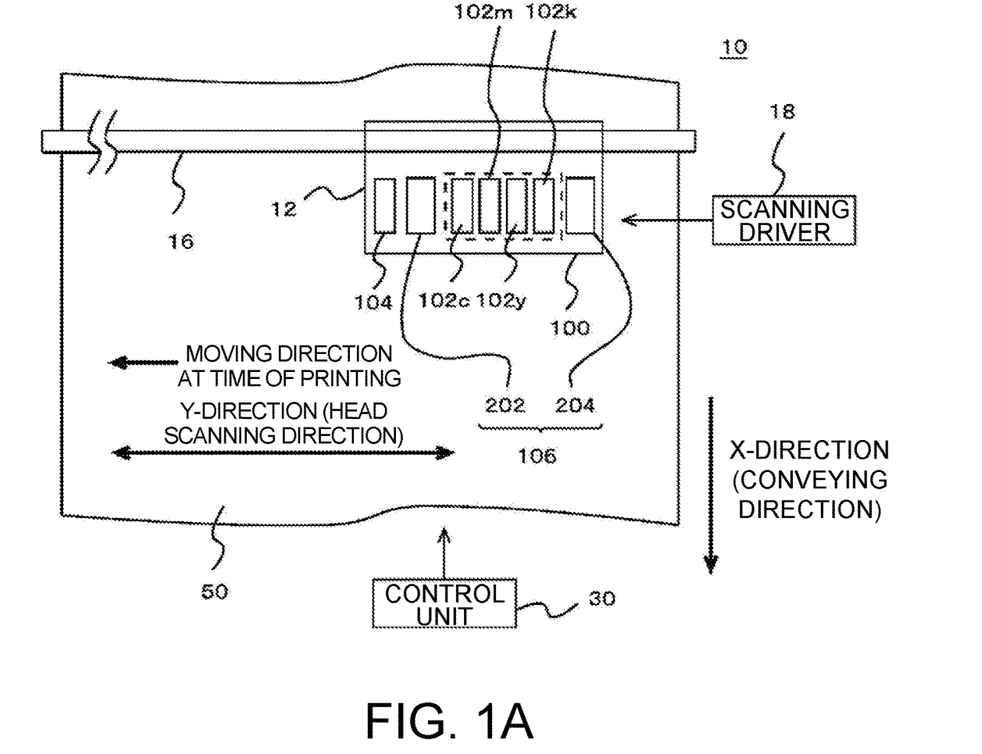
FIGS. 1A and 1B are top view and a cross-sectional side view, respectively, illustrating an example of a configuration of a principal part of the printing device 10 in a simplified manner.
Figure 1B:
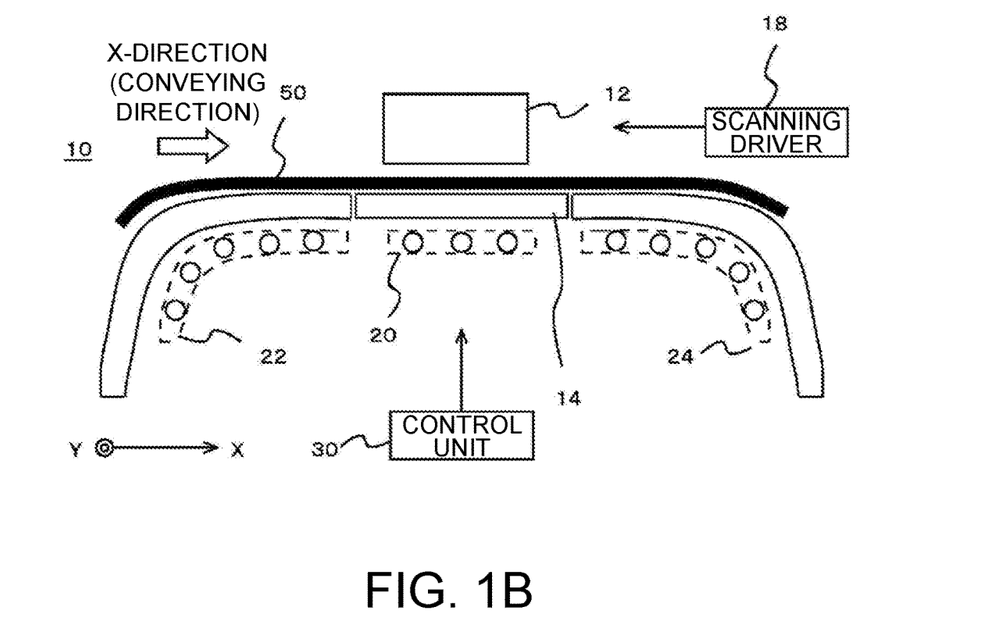

The following describes an embodiment according to the present disclosure with reference to the drawings. FIG. 1 is a diagram illustrating an example of a printing device 10 according to the embodiment of the present disclosure. FIGS. 1A and 1B are top view and a cross-sectional side view, respectively, illustrating an example of a configuration of a principal part of the printing device 10 in a simplified manner. Except the points described below, the printing device 10 may have a characteristic that is the same as or similar to that of a known printing device. For example, the printing device 10 may further have various configurations that are the same as or similar to those of a known printing device in addition to the configuration described below.

In this example, the printing device 10 is an inkjet printer that performs inkjet printing, and includes a head 12, a medium supporting unit 14, a guide rail 16, a scanning driver 18, a print heater 20, a preheater 22, an after heater 24, and a control unit 30. The printing device 10 is a serial inkjet printer that causes the head 12 to perform main scanning operation. In this case, the main scanning operation means, for example, an operation of ejecting ink (ink droplet) while moving in a main scanning direction (Y-direction in the drawings) set in advance. Herein, "cause the head 12 to perform main scanning operation" means to cause the inkjet head of the head 12 to perform main scanning operation. In this example, for example, the printing device 10 performs serial printing using a multi-pass scanning system for performing main scanning operation multiple times on respective positions on a medium.

The head 12 is a portion that ejects ink onto a medium (media) 50 as a printing target, and includes a carriage 100, a plurality of inkjet heads, and an ultraviolet ray irradiation unit 106. The carriage 100 is a holding member that holds the inkjet heads and the ultraviolet ray irradiation unit 106. In this example, as illustrated in the drawing, the head 12 includes an inkjet head 102c, an inkjet head 102m, an inkjet head 102y, an inkjet head 102k, and an inkjet head 104 as the inkjet heads. In this example, these inkjet heads are disposed side by side in the main scanning direction while aligning positions thereof in a sub scanning direction (X-direction in the drawing) orthogonal to the main scanning direction.

Among the inkjet heads in the head 12, the inkjet head 102c, the inkjet head 102m, the inkjet head 102y, and the inkjet head 102k (hereinafter, referred to as inkjet heads 102c to 102k) are examples of a head for color ink, and eject ink of different colors. More specifically, in this example, the inkjet heads 102c to 102k eject the ink of respective process colors used for full-color representation. More specifically, the inkjet head 102c ejects the ink of cyan color (C color). The inkjet head 102m ejects the ink of magenta color (M color). The inkjet head 102y ejects the ink of yellow color (Y color). The inkjet head 102k ejects the ink of black color (K color). In this case, the ink of respective CMYK colors is an example of the color ink. In this example, as the ink of respective CMYK colors, for example, the ink containing pigments of respective CMYK colors is used. In this case, the pigment is an example of a solid colorant. As the ink of respective CMYK colors, for example, preferably used is ink containing a disperser that prevents the components of the ink (for example, solid components such as pigments) from being coagulated. In this case, for example, the disperser can be considered to be a substance and the like for dispersing the components of the ink into a solvent in the ink. As the disperser, a known disperser can be preferably used.

Among the inkjet heads in the head 12, the inkjet head 104 is an example of the head for pretreatment agent, and ejects the pretreatment agent. In this case, the pretreatment agent means, for example, a liquid that is applied to the medium 50 before the color ink is applied to the medium 50. More specifically, in this example, the inkjet head 104 uses, as the pretreatment agent, a liquid containing a substance that coagulates the components of the color ink. In this case, for example, the pretreatment agent can be considered to be an example of a liquid for coagulation. The inkjet head 104 can be considered to be, for example, an example of a head for liquid for coagulation. For example, "coagulate the components of the color ink" means to coagulate solid components and the like contained in the color ink. For example, "coagulate solid components and the like contained in the color ink" means to gather the solid components and the like dispersed in the solvent in the ink. In this case, for example, the pretreatment agent coagulates the components of the color ink by canceling the effect of the disperser in the color ink. As the pretreatment agent, for example, a liquid and the like containing a known coagulant can be preferably used. In this case, the coagulant can be considered to be, for example, a coagulating agent or a solidifier. The coagulant can also be considered to be, for example, a substance and the like that prevent bleeding of the ink by a coagulation effect.

In this example, as the color ink ejected from the inkjet heads 102c to 102k and the pretreatment agent ejected from the inkjet head 104, evaporation-drying ink is used. In this case, the ink means, for example, a functional liquid. The evaporation-drying ink means, for example, ink to be fixed to the medium 50 by evaporating the solvent. The solvent means, for example, a liquid that dissolves or disperses other components of the ink. The evaporation-drying ink can also be considered to be, for example, ink and the like containing 30 weight % or more of solvent. Content of the solvent in the evaporation-drying ink is preferably 70 weight % or more. In this case, as the solvent, a liquid corresponding to a type of the ink is used. For example, in a case of water-based ink, a water-based solvent such as water is used as the solvent. In a case of solvent-type ink, an organic solvent is used as the solvent. The solvent is not limited to a specific liquid. As the solvent, various liquids may be used such as water, a liquid obtained by mixing water with one or more types of solvents (organic solvent), or a liquid obtained by mixing a plurality of solvents.

In this example, the evaporation-drying ink used as the color ink and the pretreatment agent is ink (fast-drying ink) that generates heat when being irradiated with energy rays. For example, "ink generates heat when being irradiated with energy rays" means that the ink itself generates heat by absorbing emitted energy rays. In this case, the color ink used in this example can be considered to be, for example, ink that contains the solvent and generates heat in response to energy rays. The color ink can also be considered to be color ink (UV fast-drying color ink) and the like that is instantaneously dried by being irradiated with ultraviolet rays. The pretreatment agent can be considered to be, for example, a liquid and the like that contain the solvent and generate heat in response to energy rays. The pretreatment agent can also be considered to be a coagulant (UV fast-drying coagulant) and the like that is instantaneously dried by being irradiated with ultraviolet rays. The pretreatment agent can also be considered to be fast-drying coagulant ink (more specifically, UV fast-drying coagulant ink) and the like as fast-drying ink to which a coagulant is added.

In this example, ultraviolet rays (UV light) are used as energy rays. As the color ink and the pretreatment agent, for example, ink containing ultraviolet ray absorber (UV absorber) is used. In this case, the ultraviolet ray absorber is an example of an energy absorber that absorbs energy rays to generate heat. The ultraviolet ray absorber can be considered to be, for example, a substance for instantaneously heating the solvent in the ink to be dried in response to irradiation of ultraviolet rays. As the ultraviolet ray absorber, preferably used is a substance that appropriately absorbs ultraviolet rays generated by the ultraviolet ray irradiation unit 106 in the head 12 (substance that absorbs ultraviolet rays having an emission wavelength of the ultraviolet ray irradiation unit 106). With this configuration, for example, the color ink and the pretreatment agent can be caused to appropriately generate heat by being irradiated with ultraviolet rays, and caused to function as the fast-drying ink. Depending on composition of the color ink and the pretreatment agent, a component having ultraviolet ray absorbing action may be used as any of components (for example, a colorant, a resin, and a solvent) of an ink vehicle. In this case, instead of adding an ultraviolet ray absorber dedicated for causing the ink to generate heat, other components of the ink (for example, a colorant, a resin, and a solvent) may be caused to also function as the ultraviolet ray absorber. The fast-drying ink used in this example can be considered to be, for example, ink and the like that generate heat by converting energy of emitted ultraviolet rays (UV light energy) into thermal energy.

In the head 12 in this example, the ultraviolet ray irradiation unit 106 is an example of the energy ray irradiation unit, and emits ultraviolet rays as an example of energy rays to the pretreatment agent and the color ink applied to the medium 50 to cause the pretreatment agent and the color ink to generate heat. With this configuration, for example, the pretreatment agent and the color ink can be heated efficiently and appropriately, and at least part of the solvents thereof can be evaporated. More specifically, in this example, the ultraviolet ray irradiation unit 106 includes a UV light source 202 and a UV light source 204. As the UV light source 202 and the UV light source 204, for example, used is a UVLED (UV-LED emitting device) as an LED that generates ultraviolet rays. With this configuration, for example, ultraviolet rays in a required wavelength range can be emitted appropriately and efficiently. As the UVLED, preferably used is a UVLED having a central wavelength of light emission equal to or smaller than 400 nm. More specifically, in this case, for example, the UVLED may emit ultraviolet rays that have an emission center in a range from 360 to 390 nm and have intensity of about 0.1 to 5 Joule/cm$^2$. The wavelength of the ultraviolet rays generated by the UVLED is not limited to that described above, and it is sufficient that the fast-drying ink to be used can be appropriately heated with the wavelength. In this example, the UV light source 202 and the UV light source 204 are an example of a UV emitting device.

In this example, the UV light source 202 is aligned with the inkjet head 104 and the inkjet heads 102c to 102k in the sub scanning direction, and disposed between the inkjet head 104 and the inkjet heads 102c to 102k at a position to be behind the inkjet head 104 at a time of main scanning operation. With this configuration, the ultraviolet ray irradiation unit 106 emits, with the UV light source 202, ultraviolet rays to respective positions at which printing is performed on the medium 50 after the inkjet head 104 ejects the pretreatment agent and before the inkjet heads 102c to 102k eject the color ink. Due to this, the UV light source 202 causes the pretreatment agent to generate heat, and vaporize at least part of the solvent in the pretreatment agent to be evaporated. In this case, for example, "respective positions at which printing is performed on the medium 50" means respective positions in a region through which the inkjet head 104 and the inkjet heads 102c to 102k pass while ejecting the ink at the time of main scanning operation. With this configuration, for example, the pretreatment agent can be efficiently dried in a short time before the color ink is landed at the respective positions on the medium 50.

The UV light source 204 is aligned with the inkjet head 104 and the inkjet heads 102c to 102k in the sub scanning direction, and disposed at a position to be behind the inkjet heads 102c to 102k at the time of main scanning operation. With this configuration, the ultraviolet ray irradiation unit 106 emits, with the UV light source 204, ultraviolet rays to the respective positions at which printing is performed on the medium 50 after the inkjet heads 102c to 102k eject the color ink. Due to this, the UV light source 204 causes the color ink to generate heat, and vaporize at least part of the solvent in the color ink to be evaporated. With this configuration, for example, the color ink can also be efficiently dried in a short time.

The medium supporting unit 14 is a table-like member (platen) that supports the medium 50, and supports the medium 50 to be opposed to the head 12. In this example, the medium supporting unit 14 houses the print heater 20, the preheater 22, and the after heater 24 therein. The guide rail 16 is a rail member that guides movement of the head 12 at the time of main scanning operation.

The scanning driver 18 is a driver that causes the head 12 to perform scanning operation of moving relatively to the medium 50. In this case, for example, "causes the head 12 to perform scanning operation" means to cause the inkjet head of the head 12 to perform scanning operation. In this example, the scanning driver 18 causes the head 12 to perform main scanning operation and sub scanning operation as scanning operation. In this case, the scanning driver 18 causes the head 12 to perform main scanning operation to cause the inkjet head 104 of the head 12 to eject the pretreatment agent to the respective positions on the medium 50, and cause the inkjet heads 102c to 102k to eject the color ink. The UV light source 202 and the UV light source 204 are moved together with the inkjet head 104 and the inkjet heads 102c to 102k at the time of main scanning operation to emit ultraviolet rays to the pretreatment agent and the color ink on the medium 50. In this example, the printing device 10 is a unidirectional printer that performs main scanning operation only in one direction (one way) indicated by an arrow in the drawing as a moving direction at a time of printing. The scanning driver 18 causes the head 12 to perform sub scanning operation during intervals in the main scanning operation (in each pass-scanning) to successively change the position on the medium 50 to be opposed to the head 12. In this case, the sub scanning operation means, for example, an operation of moving relatively to the medium 50 in the sub scanning direction orthogonal to the main scanning direction. More specifically, in this example, the scanning driver 18 conveys the medium 50 in a conveying direction parallel to a direction illustrated in the drawing as the X-direction to cause the head 12 to perform sub scanning operation. In this case, for example, the medium 50 is conveyed in the conveying direction indicated by the arrow in the drawing (media conveying direction) using a roller (not illustrated) and the like.

The print heater 20, the preheater 22, and the after heater 24 are heating means that heats the medium 50. Among these, the print heater 20 is a heater that heats the medium 50 at a position opposed to the head 12. By using the print heater 20, for example, the ink (the pretreatment agent and the color ink) on the medium 50 can be heated more efficiently. In this case, the configuration of the printing device 10 in this example can be considered to be a configuration for drying the ink using the ultraviolet ray irradiation unit 106 and the print heater 20 together.

In a case in which a heating temperature of the print heater 20 is high, for example, the inkjet head of the head 12 is heated, so that a problem such as nozzle clogging is easily caused. In this case, for example, "nozzle clogging" means that a nozzle of the inkjet head is clogged due to dried ink. Thus, the heating temperature of the print heater 20 is preferably equal to or lower than 70° C. In this example, as described above, the ink can be efficiently heated by using the UV light source 202 and the UV light source 204 of the ultraviolet ray irradiation unit 106. Thus, it is more preferable to cause the heating temperature of the print heater 20 to be sufficiently low to suppress influence of an environment temperature and stabilize a temperature of the medium 50, for example. Also in this case, by using the print heater 20, an evaporating condition for the solvent in the ink can be appropriately stabilized. More specifically, for example, the print heater 20 heats the region opposed to the print heater 20 at a temperature closer to a room temperature (for example, a temperature equal to or lower than about 50° C.). The heating temperature of the medium 50 heated by the print heater 20 is preferably equal to or lower than 40° C., more preferably, equal to or lower than 35° C. With this configuration, for example, influence of an environment temperature and the like can be appropriately suppressed while preventing a problem such as nozzle clogging.

The preheater 22 is a heater that heats (preheats) the medium 50 on an upstream side of the head 12 in the conveying direction. By using the preheater 22, for example, an initial temperature of the medium 50 can be appropriately adjusted before the medium 50 reaches the position of the head 12. In this case, the heating temperature of the medium 50 heated by the preheater 22 is preferably caused to be a sufficiently low temperature (for example, a temperature equal to or lower than 50° C., preferably equal to or lower than 40° C., and more preferably, equal to or lower than 35° C.) to suppress influence of an environment temperature, for example. The after heater 24 is a heater that heats the medium 50 on a downstream side of the head 12 in the conveying direction. By using the after heater 24, for example, the ink can be more securely dried by a time when printing is completed. The heating temperature of the medium 50 heated by the after heater 24 may be, for example, about 30 to 50° C. The after heater 24 can be considered to be, for example, a heater for postheating (post-drying means) for completely removing solvent components remaining at a time when heating is performed by the print heater 20. The heating temperature of the after heater 24 may be set to a high temperature in some degree in a range equal to or lower than a heat resistance temperature of the medium 50 to be used.

As described above, in this example, at least part of the solvent in the pretreatment agent and the color ink is evaporated by using the UV light source 202 and the UV light source 204. In this case, the pretreatment agent and the color ink can be dried mainly by emitting ultraviolet rays. Thus, depending on the environment in which the printing device 10 is used or required printing quality, some or all of the print heater 20, the preheater 22, and the after heater 24 may be omitted. As the print heater 20, the preheater 22, and the after heater 24, various types of known heating means may be used. More specifically, as the print heater 20, the preheater 22, and the after heater 24, for example, various heaters, a fan heater, and the like (for example, a heat transfer heater, a warm air heater, and an infrared heater) can be preferably used. As the after heater 24, for example, a UV light source (UV post-emitting device) may be used.

The control unit 30 is, for example, a CPU of the printing device 10, and controls an operation of each component of the printing device 10. For example, the control unit 30 causes the inkjet head 104 to eject the pretreatment agent to a required ejection position at each time of main scanning operation, and causes the inkjet heads 102c to 102k to eject the ink at a set timing corresponding to an image to be printed. According to this example, for example, a desired image can be appropriately printed by the printing device 10.

Figure 2A:
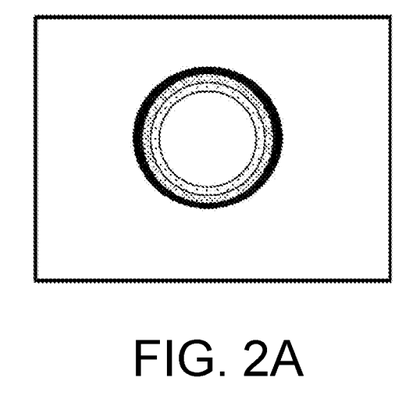
FIG. 2A illustrates an example of a method of drying ink in a case of drying the ink with a conventional configuration.
Figure 2B:
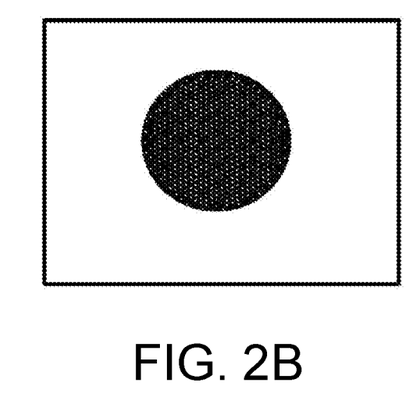
FIG. 2B illustrates an example of a method of drying the ink in a case of drying the ink with a configuration according to this example.
Figure 2C:
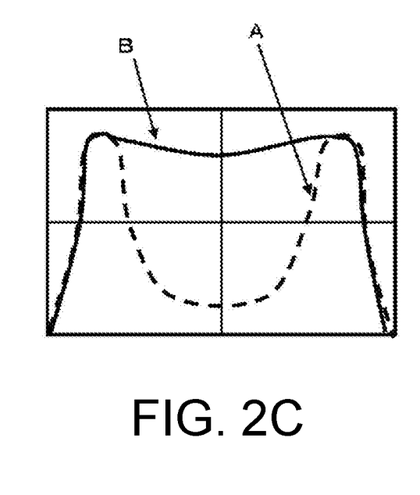
FIG. 2C is a graph for comparing density distribution of the ink between the states illustrated in FIGS. 2A and 2B.

Subsequently, the following describes a characteristic of the printing operation performed in this example in more detail. FIG. 2 is a diagram for explaining a phenomenon caused after the color ink is landed on the medium 50. FIG. 2A is a diagram illustrating an example of a method of drying the ink (conventional drying model) in a case of drying the ink with a conventional configuration, and illustrates an example of a state of one dot formed of the color ink. FIG. 2B is a diagram illustrating an example of a method of drying the ink (drying model according to this example) in a case of drying the ink with the configuration according to this example, and illustrates an example of a state of one dot formed of the color ink at a position where the pretreatment agent is previously ejected. For convenience of illustration, FIGS. 2A and 2B schematically illustrate a difference in color density by hatching. FIG. 2C is a graph for comparing density distribution (density distribution after drying) of the ink between the states illustrated in FIGS. 2A and 2B.

As described above, in this example, the ink is dried by emitting ultraviolet rays using fast-drying color ink and the like. In this case, unlike the case of indirectly heating the ink by heating the medium with a heater and the like, for example, the ink is directly heated by being irradiated with ultraviolet rays, so that the ink can be efficiently and appropriately heated while suppressing influence on a surrounding configuration and the medium 50, for example. Due to this, for example, as compared with the case of performing heating by using only the heater, the ink can be heated to a higher temperature.

However, in this case, if the fast-drying color ink is simply used, viscosity of the ink may be temporarily lowered due to the higher temperature of the ink, and a flow of components of the ink may be generated from a center part toward a peripheral part within the dot of the ink that is formed when a droplet of the ink is landed on the medium, for example. In this case, "the fast-drying color ink is simply used" means, for example, that the fast-drying color ink is directly ejected onto the medium without using the pretreatment agent and the like. In this case, for example, the colorant of the ink such as a pigment easily moves to the peripheral part of the dot, and a coffee stain phenomenon may be easily caused. More specifically, in this case, as illustrated in FIG. 2A for example, distribution of color density within the dot of the ink (density distribution after drying) is such that the color becomes light near the center part and becomes deep at the peripheral part. In this case, image quality may be deteriorated due to influence such that a light color portion is generated in a printed image, and average density of the color for coloring is lowered, for example. In this case, the distribution of the color density within the dot of the ink (density distribution within the dot) is, for example, represented as a curved dashed line denoted by a sign A in FIG. 2C.

By contrast, in a case of using the pretreatment agent that coagulates the components of the color ink as described in this example, the components of the color ink can be appropriately coagulated by using the pretreatment agent immediately after the color ink is landed, and the viscosity thereof can be increased. In this case, even when ultraviolet rays are emitted to increase the temperature of the color ink, a phenomenon that the colorant of the ink moves to the peripheral part of the dot is hardly caused. More specifically, in this case, the viscosity of the color ink has been already increased, so that the viscosity is hardly lowered in a process of evaporating/drying the color ink by emitting ultraviolet rays (at a time when the color ink generates heat). Due to this, for example, the colorant in the components of the ink (a particle of the pigment and the like) can be caused to hardly move with low viscosity. Thus, according to this example, for example, it is possible to appropriately prevent the occurrence of the coffee stain phenomenon, and the density of the dot of the ink can be appropriately increased even at the center part, for example. In this case, the distribution of the color density within the dot of the ink is represented as a solid curved line denoted by a sign B in FIG. 2C, for example. In this case, as is clear from comparison with the curved line denoted by the sign A, uniform density distribution can be appropriately achieved even at the center part of the dot of the ink. Due to this, average density on printed matter is appropriately increased, and high-quality printing can be performed.

As the medium used in this example, for example, an absorbable medium such as paper and fabric may be used. The absorbable medium means, for example, a medium that absorbs the pretreatment agent and the color ink. In a case of using such a medium, when a total amount of the pretreatment agent and the color ink is increased, typically, problems such as a curl and cockling of the medium may easily occur. By contrast, in this example, it is possible to appropriately prevent the occurrence of such problems by using the fast-drying pretreatment agent.

More specifically, in this example, as described above, ultraviolet rays are emitted from the UV light source 202 (refer to FIG. 1) of the ultraviolet ray irradiation unit 106 using the fast-drying pretreatment agent to evaporate, before the color ink is ejected to the respective positions on the medium, at least part of the solvent in the pretreatment agent applied to a position. In this case, the pretreatment agent may be dried at least to a degree such that problems such as a curl and cockling do not occur at a following time when the color ink is ejected. For example, "the problems such as a curl and cockling do not occur" means that, for example, a curl, a cockling, and the like as the problems do not occur in accordance with required printing quality and the like. With this configuration, it is possible to appropriately prevent the occurrence of problems such as a curl and cockling. In a case of using the pretreatment agent as described above, the viscosity of the color ink is increased immediately after landing, so that the coffee stain phenomenon is hardly caused even when strong ultraviolet rays are emitted thereafter. Thus, according to this example, for example, printing can be more appropriately performed using the fast-drying color ink while appropriately preventing the occurrence of the coffee stain phenomenon.

In a case of using the pretreatment agent as described above, the viscosity of the color ink is increased immediately after landing, so that a condition for causing the color ink to hardly bleed can be achieved, for example. In this case, a condition for emitting ultraviolet rays to the color ink may be caused to be gentle as compared with a case of not using the pretreatment agent, for example. More specifically, for example, in a case of efficiently drying the color ink in a short time, stronger ultraviolet rays may be emitted to the color ink to further increase the temperature of the color ink. In this case, for example, ultraviolet rays may be emitted under a condition such that the solvent in the color ink boils. However, in this case, a new problem may be caused due to influence of temporarily high temperature of the ink. For example, in a case of emitting ultraviolet rays under a condition such that the solvent in the color ink boils, irradiation energy of the ultraviolet rays becomes excessive, and the solvent in the ink may bump, for example. As a result, a surface of the ink is not sufficiently planarized, and a surface of the printed matter may be in a mat state, for example. Due to influence of bumping, the surface of the ink on the medium may be in a porous coating film state, for example. In a case in which such a phenomenon occurs, a high-gloss print surface may be hardly obtained. In this case, even when a medium for glossy printing (glossy media) such as a nonpermeable plastic medium is used, for example, sufficient gloss is hardly obtained.

By contrast, in a case of using the pretreatment agent as described above, for example, ultraviolet rays may be emitted to the color ink applied to the medium so that the solvent in the color ink does not boil. In this case, by heating the ink under a condition for preventing the solvent in the color ink from boiling, for example, the temperature of the ink can be prevented from being increased, and the viscosity of the ink can be more appropriately prevented from being lowered at the time of heating. Thus, with this configuration, for example, it is possible to appropriately prevent the occurrence of the coffee stain phenomenon.

In a case of performing printing with the configuration described above with reference to FIG. 1, for example, color mixture with the ink of another color is not caused at a time when the ink as the pretreatment agent is ejected. Thus, also at the time when the pretreatment agent is ejected, heating may be performed under a gentle condition such that the solvent in the pretreatment agent does not boil, for example. More specifically, in a case of emitting energy rays to the pretreatment agent applied to the medium, for example, ultraviolet rays may be emitted by the UV light source 202 of the ultraviolet ray irradiation unit 106 so that the solvent in the pretreatment agent does not boil. With this configuration, for example, it is possible to appropriately prevent the occurrence of a problem that occurs when the temperature of the pretreatment agent becomes temporarily high.

It is preferable that a degree of drying of the pretreatment agent is appropriately adjusted in accordance with composition and the like of the pretreatment agent and the color ink to be used, for example. For example, in a case in which there is no problem even if the pretreatment agent is completely dried before the color ink is ejected, it is preferable that the pretreatment agent is sufficiently dried to a degree such that the pretreatment agent is completely dried before the color ink is ejected, for example. With this configuration, for example, drying of the pretreatment agent can be appropriately facilitated before the color ink is ejected to the respective positions on the medium. Due to this, for example, it is possible to securely prevent the occurrence of a curl, a cockling, and the like. Depending on the composition of the pretreatment agent and the color ink, for example, it may be preferable that the pretreatment agent is not completely dried, and the undried pretreatment agent containing remaining solvent is brought into contact with the color ink. In such a case, it is preferable to evaporate part of the solvent in the pretreatment agent so that the color ink is landed on the undried pretreatment agent without completely drying the pretreatment agent. With this configuration, the pretreatment agent and the color ink can be mixed on the medium more appropriately. Depending on the composition of the pretreatment agent and the color ink, for example, without drying the pretreatment agent before being brought into contact with the color ink, the pretreatment agent and the color ink may be dried at the same time after the color ink is ejected. In this case, for example, printing may be performed by using the printing device 10 having a configuration obtained by omitting the UV light source 202 from the configuration illustrated in FIG. 1. Also in such a case, by using the fast-drying pretreatment agent and the fast-drying color ink, the pretreatment agent and the color ink can be efficiently dried in a short time. Due to this, for example, a curl, a cockling, and the like can be caused to be hardly generated.

Figure 3:
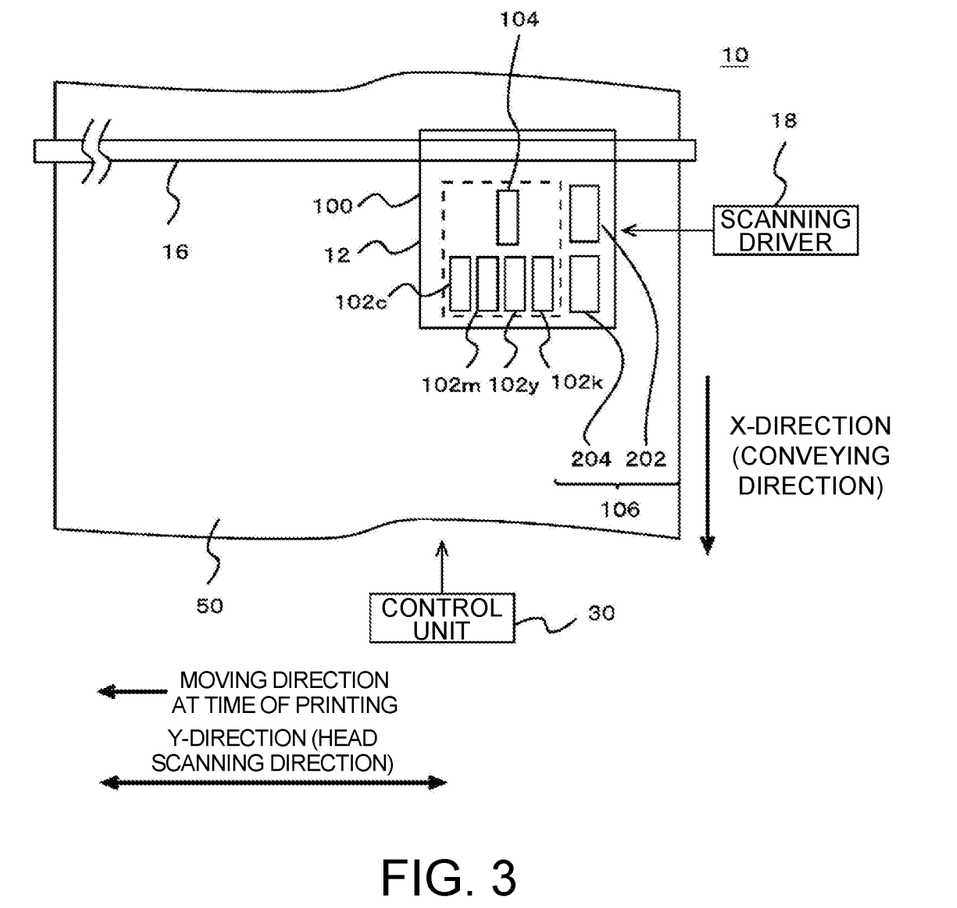
FIG. 3 is a top view illustrating a modification of the configuration of the printing device 10.

A specific configuration and the like of the printing device 10 are not limited to the configuration described above, and can be variously modified. FIG. 3 is a top view illustrating a modification of the configuration of the printing device 10. Except the points described below, a configuration in FIG. 3 denoted by the same reference numeral as that in FIG. 1 may have a characteristic that is the same as or similar to that of the configuration in FIG. 1.

In the present modification, the printing device 10 is a serial inkjet printer in which the arrangement of the inkjet head and the UV light source in the head 12 is different from that in FIG. 1. In the head 12 according to the present modification, the inkjet head 104 for pretreatment agent is disposed to be shifted from the positions of the inkjet heads 102c to 102k for color ink in the sub scanning direction to configure another column. Corresponding to this arrangement, the UV light source 202 that emits ultraviolet rays to the pretreatment agent is disposed to be aligned with the position of the inkjet head 104 in the sub scanning direction to be shifted, in the sub scanning direction, from the position of the UV light source 204 that emits ultraviolet rays to the color ink.

Also with this configuration, the fast-drying pretreatment agent and the fast-drying color ink are used, and the components of the color ink are coagulated with the pretreatment agent, so that an effect similar to that in the case described above with reference to FIGS. 1 and 2 can be obtained. In the present modification, the pretreatment agent and the color ink are ejected to the respective positions on the medium 50 at different times of main scanning operation. In this case, a time from when the pretreatment agent is ejected until the color ink is ejected is prolonged, so that the pretreatment agent can be more appropriately dried by the time when the color ink is ejected, for example. Thus, according to the present modification, for example, an amount of liquid permeating the medium can be more appropriately reduced at each timing. Due to this, for example, a curl, a cockling, and the like of the medium can be more appropriately prevented. The configuration according to the present modification can be considered to be, for example, a configuration that is especially preferable for a case in which an effect of coagulating the color ink can be obtained even if the pretreatment agent is dried to a certain degree or more (for example, semi-dried or completely dried).

According to a further modification of the configuration of the printing device 10, for example, the inkjet heads 102c to 102k for color ink may also be disposed in another column to be shifted in the sub scanning direction for each color. With this configuration, by ejecting the ink of one color to each position, the amount of the liquid permeating the medium can be more appropriately reduced at each timing. Due to this, for example, a curl, a cockling, and the like of the medium can be more appropriately prevented. In this case, the ink of only one color is ejected to the same position in each main scanning operation, and for example, it is therefore possible to prevent bleeding of the ink more securely.

In the above description, mainly described is an example of the configuration of the printing device 10 in a case of performing the main scanning operation in one direction (unidirectional print). However, in a further modification of the configuration of the printing device 10, a configuration of performing a reciprocative main scanning operation (bidirectional print) may be used as the configuration of the printing device 10. In this case, the UV light source 202 and the UV light source 204 are preferably disposed not only one side but on both sides in the main scanning direction with respect to a corresponding inkjet head. The configuration of the printing device 10 is not limited to a serial configuration, and a line configuration (line printer) may be used, for example. In this case, the line configuration means, for example, a configuration of ejecting the ink from the inkjet head while conveying the medium in a predetermined direction without moving the position of the inkjet head.

Figure 4:
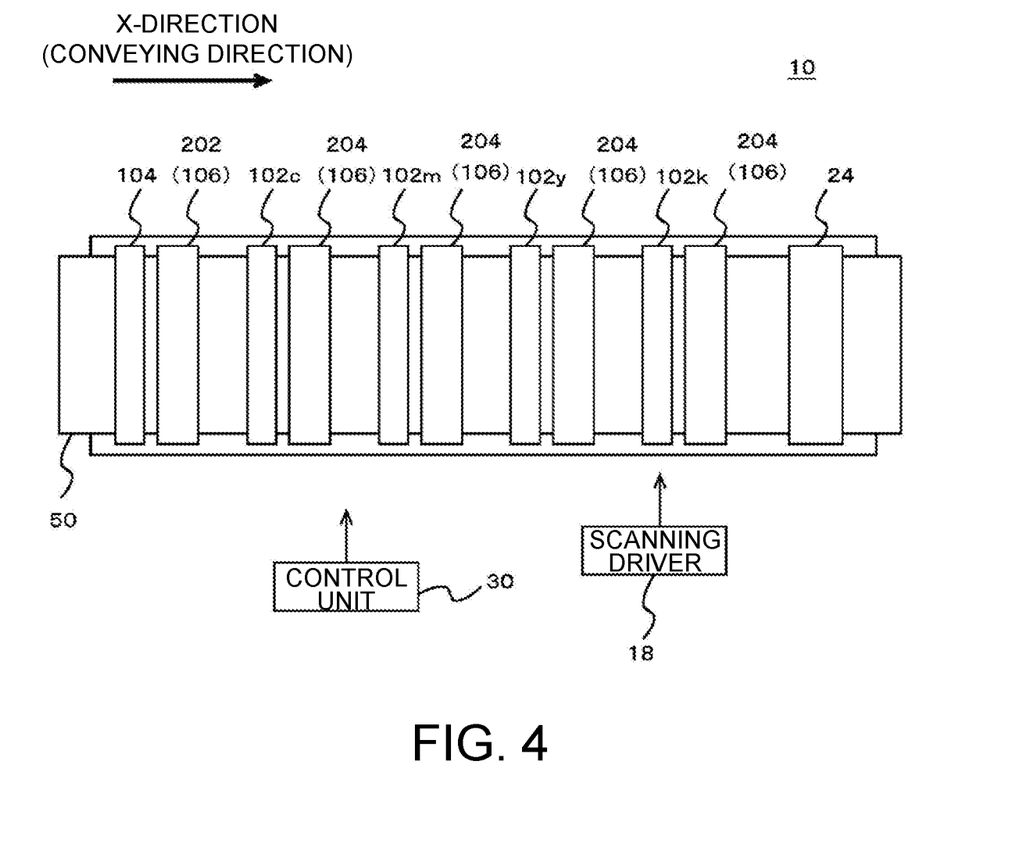
FIG. 4 is a top view illustrating a further modification of the configuration of the printing device 10.

FIG. 4 is a top view illustrating a further modification of the configuration of the printing device 10, and illustrates the configuration of the printing device 10 in a case of the line printer. Except the points described below, a configuration in FIG. 4 denoted by the same reference numeral as that in FIGS. 1 to 3 may have a characteristic that is the same as or similar to that of the configuration in FIGS. 1 to 3.

In the present modification, the inkjet head 104 for pretreatment agent and the inkjet heads 102c to 102k for color ink are disposed side by side at intervals along the conveying direction (X-direction) of the medium 50 as illustrated in the drawing. In the present modification, the ultraviolet ray irradiation unit 106 includes the UV light source 202 for a pretreatment agent and a plurality of UV light sources 204 for color ink. In this case, the UV light source 202 is disposed on a downstream side of the inkjet head 104 in the conveying direction so as to emit ultraviolet rays to the medium 50 immediately after the inkjet head 104 ejects the pretreatment agent. The UV light sources 204 are disposed on a downstream side of the respective inkjet heads 102 in the conveying direction so as to emit ultraviolet rays to the medium 50 immediately after the respective inkjet heads 102c to 102k eject the ink of respective colors. In this case, as illustrated in the drawing, the after heater 24 may be disposed at a position on a downstream side of these configurations in the conveying direction. Also with this configuration, the fast-drying pretreatment agent and the fast-drying color ink are used, and the components of the color ink are coagulated with the pretreatment agent, so that an effect similar to that in the case described above with reference to FIGS. 1 to 3 can be obtained. In a case of using the printing device 10 of a line type, for example, printing may be performed on both surfaces of the medium 50 (duplex printing). In this case, for example, a total amount of the ink ejected to the respective positions on the medium 50 is increased as compared with a case of performing printing on only one surface. Thus, in such a case, an effect of using the fast-drying pretreatment agent and the fast-drying color ink may be especially increased.

Subsequently, the following describes supplementary explanation about the configurations described above, a further modification, and the like. First, the following describes an effect and the like obtained through the configurations described above. As described above, in the configurations described above with reference to FIGS. 1 to 4, printing is performed by using a system of instantaneously drying the ink by emitting ultraviolet rays (UV fast-drying system) with the fast-drying ink. In this case, by instantaneously fixing the ink to the medium, high-speed printing can be performed while preventing the occurrence of bleeding. In this case, as the fast-drying ink, preferably used is ink and the like obtained by adding an ultraviolet ray absorber to known various kinds of evaporation-drying ink. As known evaporation-drying ink, for example, known solvent ink, water-based ink, latex ink, or emulsion type ink may be used. In this case, by using the fast-drying ink, for example, even in a case of using a medium on which direct printing is hardly performed due to influence of bleeding and the like only by using known ink with a conventional configuration, direct printing can be appropriately performed on the medium. For example, in a case of using fast-drying water-based ink, printing can be appropriately performed on an absorbable medium such as paper and fabric, and an unabsorbable medium such as various plastic films, metal, glass, and the like.

More specifically, in a case of using the fast-drying ink, for example, even in a case of reducing a number of passes of printing to perform high-speed printing, it is possible to appropriately prevent the occurrence of bleeding. Thus, for example, a high-speed printer and the like that perform printing at high speed can be appropriately implemented. As the printing device 10, the printing device 10 having various configurations from a one-pass system to a multi-pass system (multi-pass print) can be used. By appropriately preventing the occurrence of bleeding, for example, a media-free configuration of using various media can be implemented. Thus, as the medium, for example, various media such as a medium in which a receiving layer is not formed, an absorbable (permeable) medium, and an unabsorbable (impermeable) medium can be widely used.

In a case of using the fast-drying ink, the ink can be directly and efficiently heated as compared with a configuration of indirectly heating the ink via the medium by using a heater and the like. In a case of using ultraviolet rays as energy rays as in the configurations described above, the ultraviolet rays can permeate an inner part of the ink applied to the medium to heat the ink from the inner part, for example. Thus, in a case in which a coat is formed on the surface of the ink at a time when the ink is dried, for example, the ink in a portion surrounded by the coat can be dried more appropriately. In a case of using the fast-drying ink, for example, a downsized device, a lower price, energy saving, and the like can be achieved as compared with a case of using a heater. More specifically, in a case of using the fast-drying ink, for example, a configuration for heat radiation is simplified, so that a downsized device and a lower price can be achieved as compared with the case of using a heater. Energy saving can be achieved such that average power consumption is reduced to be several times smaller, and standby power consumption is caused to be zero.

As described above, in the configurations described above with reference to FIGS. 1 to 4, the pretreatment agent is ejected to the medium in addition to the color ink for printing an image. The fast-drying ink (fast-drying liquid) is also used as the pretreatment agent. With this configuration, by heating the pretreatment agent and the color ink in a short time using a fast-drying system, most part of the solvent can be appropriately evaporated before permeating the medium. Thus, even in a case of using an absorbable medium, for example, it is possible to efficiently prevent the occurrence of a curl and cockling when the medium absorbs the solvent and swells.

More specifically, in a case of using a medium constituted of fiber and the like to be swelled when absorbing liquid such as water, for example, paper or fabric, an amount of liquid (components of the solvent) applied to the medium is increased when an extra pretreatment agent is ejected in addition to the color ink, so that a curl, a cockling, and the like are more easily generated as compared with the case of using only the color ink. When a curl, a cockling, and the like are generated, meandering may occur at a time of conveying the medium, and the inkjet head may be brought into contact with the medium, for example. Due to influence thereof, image quality may be deteriorated (a defect in image quality). By contrast, in a case of using the fast-drying pretreatment agent, most part of the solvent in the pretreatment agent can be evaporated in a short time, and it is therefore possible to appropriately prevent the occurrence of such problems. Typically, problems such as a curl and cockling are easily caused especially in a case of printing a color image with high density, and in a case of performing duplex printing, for example. By using the configuration as described above, it is possible to more appropriately prevent the occurrence of a curl, a cockling, and the like, in a case of printing a color image with high density, and in a case of performing duplex printing, for example.

As described above, as the pretreatment agent, for example, used is a liquid containing a substance that coagulates the components of the color ink. With this configuration, for example, by applying the pretreatment agent to the medium in advance, the viscosity of the color ink can be increased immediately after the color ink is landed, and the color ink can be prevented from bleeding more efficiently. Due to this, for example, printing can be appropriately performed with high resolution and high image quality. Additionally, for example, a curl and cockling can be prevented, and bleeding can be prevented at the same time appropriately.

In this case, by coagulating the components of the color ink with the pretreatment agent, for example, the coffee stain phenomenon can also be prevented, for example. More specifically, in this case, for example, even in a case of using ink and the like containing a pigment as a colorant, by increasing the viscosity of the ink immediately after the color ink is landed, the viscosity of the ink can be appropriately suppressed to a degree such that the coffee stain phenomenon is negligible even when the ink reaches a high temperature by being irradiated with ultraviolet rays thereafter. Due to this, for example, the coffee stain phenomenon can be appropriately prevented. In this case, by preventing the coffee stain phenomenon, high-density printing (high-density printing without coffee stain) can be performed more appropriately. Thus, with this configuration, for example, high-quality printing can be performed more appropriately. In this case, the color ink hardly bleeds due to the use of pretreatment agent, so that the color ink can be heated under a gentle condition of suppressing temperature rise, for example. In this case, the coffee stain phenomenon can be prevented more securely.

As described above, by preventing bleeding of the color ink using the pretreatment agent, a condition for emitting ultraviolet rays to the color ink may be caused to be gentle as compared with a case of not using the pretreatment agent, for example. Thus, in this case, for example, ultraviolet rays may be emitted to the color ink applied to the medium so that the solvent in the color ink does not boil. With this configuration, for example, a surface of the color ink can be appropriately prevented from being coarsened due to bumping of the solvent and the like. Due to this, for example, high-gloss printing can be performed more appropriately. In this case, as the color ink, ink and the like containing resin (binder resin and the like) can be preferably used. With this configuration, for example, the surface of the color ink can be prevented from being coarsened more appropriately.

The following provides supplementary explanation about various characteristics of the configurations described above. As described above, in the configurations described above with reference to FIGS. 1 to 4, the pretreatment agent is ejected before the color ink is ejected onto the medium. In this case, the pretreatment agent can be considered to be, for example, fast-drying ink for preventing bleeding. An operation of ejecting the pretreatment agent and emitting ultraviolet rays immediately thereafter can be considered to be, for example, a process of printing the pretreatment agent, emitting ultraviolet rays immediately thereafter, and performing preprinting while drying the pretreatment agent (preprinting process of UV fast-drying ink). In this case, the color ink is ejected onto the medium after the pretreatment agent is ejected. In this case, an operation of ejecting the color ink and emitting ultraviolet rays immediately thereafter can be considered to be, for example, a process of printing the color ink on the preprinted pretreatment agent, emitting ultraviolet rays immediately thereafter, and fixing the image while drying the color ink (printing process of UV fast-drying color ink).

In these processes, ultraviolet rays emitted to the pretreatment agent or the color ink may be set to have sufficient intensity (amount of light) corresponding to required printing quality and the like. More specifically, ultraviolet rays to be emitted to the pretreatment agent may be set to have intensity for at least evaporating the solvent the amount of which is sufficient for preventing a curl, a cockling, and the like. Ultraviolet rays to be emitted to the color ink may be set to have intensity for at least sufficiently drying the color ink before bleeding is generated. Furthermore, the ultraviolet rays to be emitted to the color ink is preferably set to have intensity in a range in which a problem such as a coarsened surface of the color ink is not caused. For both of the pretreatment agent and the color ink, maximum supply energy of ultraviolet rays to be emitted may be set in a range in which the ink and the like are not burnt. In this case, the maximum supply energy means, for example, a maximum value of energy of the ultraviolet rays to be emitted. In this case, the energy of the ultraviolet rays to be emitted is determined based on irradiation intensity and irradiation time of the UV light source 202 and the UV light source 204 (refer to FIG. 1) as emitting devices of ultraviolet rays. The irradiation time may be changed, for example, in accordance with printing conditions such as printing speed, the number of passes of printing, and print dot density. Thus, it is preferable that the maximum supply energy is appropriately adjusted automatically or manually by a user in a range in which the ink and the like are not burnt in accordance with these conditions.

In the above description, mainly described is a case of using the liquid that coagulates the components of the color ink as the pretreatment agent. However, in a modification of the configuration of the printing device 10, a liquid other than the liquid that coagulates the components of the color ink may be used as the pretreatment agent. More specifically, for example, in a case of using ink that is subjected to color development processing after the ink is applied to the medium (for example, dye ink and the like that develops a color through color development processing), a color developing assistant and the like may be used as the pretreatment agent. Also in this case, by using the fast-drying pretreatment agent, for example, it is possible to appropriately prevent the occurrence of a problem that occurs when a total amount of the liquid to be ejected onto the medium is increased. In a case of using a medium the curl and cockling of which are negligible, from a viewpoint of preventing bleeding or preventing the coffee stain phenomenon, for example, a pretreatment agent other than the fast-drying pretreatment agent may be used. In this case, for example, by ejecting the fast-drying color ink onto the medium after ejecting the pretreatment agent, it is possible to more appropriately prevent the occurrence of bleeding of the ink. For example, by coagulating the components of the color ink with the pretreatment agent, the coffee stain phenomenon can be appropriately prevented.

In the configurations described above, the medium to be used is not limited. Speed, a use, and the like of printing are also not limited. More specifically, for example, in a case of using the pretreatment agent and the color ink, even in a case of using an absorbable medium in which bleeding is easily generated such as paper, fabric, and sewn products such as a T-shirt in a high-speed printer that performs printing at high speed, an effect of preventing bleeding at the time of printing (at the time of print) can be appropriately obtained. With the configuration of using the pretreatment agent and the color ink, even in a case of using the pretreatment agent and the color ink at the time of printing on an unabsorbable medium such as a vinyl chloride sheet or various plastic films, for example, the effect of preventing bleeding due to fast drying can be appropriately obtained.

A specific configuration and the like of the printing device 10 are not limited to the configuration described above, and can also be further modified in various ways. For example, the position at which the UV light source (UVLED emitting device) is disposed can be variously changed in accordance with the configuration and the like of the printing device 10. In this case, for example, the UV light source may be disposed at a position corresponding to a scanning system such as serial scanning system or line scanning system. In this case, a UV light source that emits ultraviolet rays under a plurality of conditions may be disposed on a downstream side in a direction in which the medium moves relatively to the inkjet head in the scanning operation of ejecting the ink. In a case of a line configuration, the configuration is not limited to the configuration in which the UV light sources are individually disposed on the downstream side of the inkjet heads for respective CMYK colors as illustrated in FIG. 4, for example, and an inkjet head may be disposed on a downstream side of a plurality of inkjet heads for respective CMYK colors to collectively emit ultraviolet rays to the ink of respective CMYK colors. The color of the ink to be used is not limited to the color described above, and various colors of ink may be used. For example, the ink to be used as the color ink is not limited to the ink of basic color such as CMYK, and the ink of various colors such as R (red), G (green), and B (blue), or ink of another special color may be used in accordance with a purpose of printing and the like. As the ink of special color, for example, ink of metallic color or pearl color may be used. In the printing device 10, as the ink of special color, for example, ink of clear color or white color may also be used. In this case, the inkjet head for the ink of clear color or white color is preferably disposed to be shifted from the positions of the inkjet heads for respective CMYK colors (inkjet heads for color ink) in the sub scanning direction.

Depending on a characteristic of the color ink, the medium, and the like to be used, a liquid that is the same as or similar to the pretreatment agent described above may be ejected onto the medium after the color ink. More specifically, in this case, for example, the fast-drying color ink and a fast-drying liquid for coagulation may be used. The liquid for coagulation means, for example, a liquid containing a substance that coagulates the components of the color ink. In this case, for example, the liquid for coagulation is ejected to the respective positions at which printing is performed on the medium after the color ink, and ultraviolet rays are emitted to the color ink and the liquid for coagulation thereafter. Also with this configuration, the color ink and the liquid for coagulation can be dried efficiently and appropriately while preventing bleeding. Due to this, for example, it is possible to appropriately prevent the occurrence of a problem that occurs when the total amount of the liquid to be ejected onto the medium is increased. Also in this case, the coffee stain phenomenon and the like can be appropriately prevented by emitting ultraviolet rays after the color ink is mixed with the liquid for coagulation.

The present disclosure can be preferably applied to a printing device, for example.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A printing device, configured to perform printing on a medium using color ink, the printing device comprising:

a pretreatment agent head serving as an inkjet head, configured to eject a pretreatment agent as a liquid that is applied to the medium before the color ink is applied to the medium;

a color ink head serving as an inkjet head, configured to eject the color ink;

an energy ray irradiation unit, configured to emit energy rays, wherein the pretreatment agent is a liquid that contains a pretreatment agent solvent and generates heat in response to the energy rays, and the energy ray irradiation unit emits the energy rays to respective positions at which printing is performed on the medium after the pretreatment agent head ejects the pretreatment agent, and evaporates at least part of the solvent in the pretreatment agent, wherein the color ink is ink that contains a color ink solvent and generates heat in response to the energy rays, and the energy ray irradiation unit emits the energy rays to respective positions at which printing is performed on the medium after the color ink head ejects the color ink, and evaporates at least part of a color ink solvent in the color ink, wherein, in a case of emitting the energy rays to the color ink applied to the medium, the energy ray irradiation unit emits the energy rays to the color ink so that the color ink solvent in the color ink does not boil, wherein the medium is an absorbable medium that absorbs the pretreatment agent, and the energy ray irradiation unit emits the energy rays to the pretreatment agent applied to the medium to dry the pretreatment agent at least to a degree such that a curl and a cockling of the medium is not generated after the color ink is ejected onto the medium, and wherein, in a case of emitting the energy rays to the pretreatment agent applied to the medium, the energy ray irradiation unit emits the energy rays to the pretreatment agent so that the pretreatment agent solvent in the pretreatment agent does not boil.

2. The printing device according to claim 1, wherein the pretreatment agent is a liquid containing a substance that coagulates components of the color ink.

3. The printing device according to claim 1, wherein the color ink is ink containing a solid colorant.

4. The printing device according to claim 1, wherein the energy ray irradiation unit emits the energy rays to the respective positions at which printing is performed on the medium after the pretreatment agent head ejects the pretreatment agent and before the color ink head ejects the color ink, and evaporates at least part of the pretreatment agent solvent in the pretreatment agent.

* * * * *